Nov. 18, 1969   S. A. TATUM   3,478,602
FILTER FOR A BALANCING MACHINE
Filed Oct. 28, 1966   2 Sheets-Sheet 1
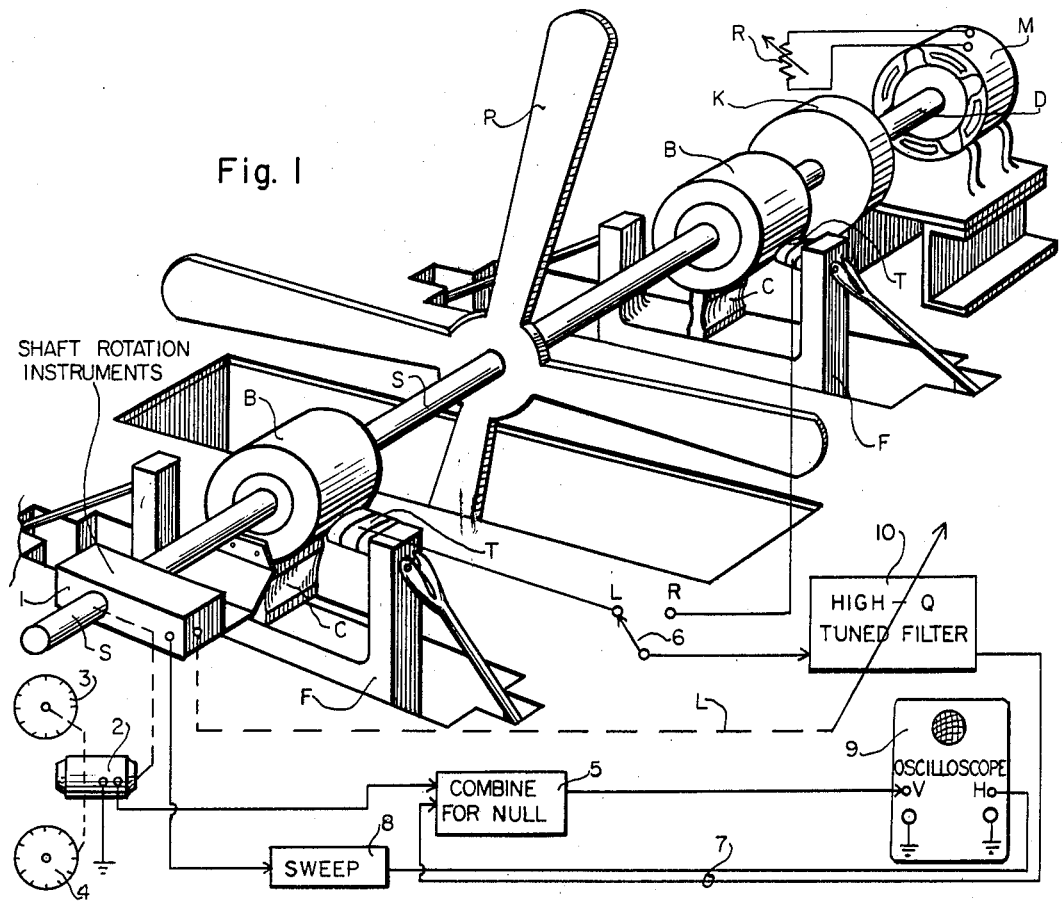
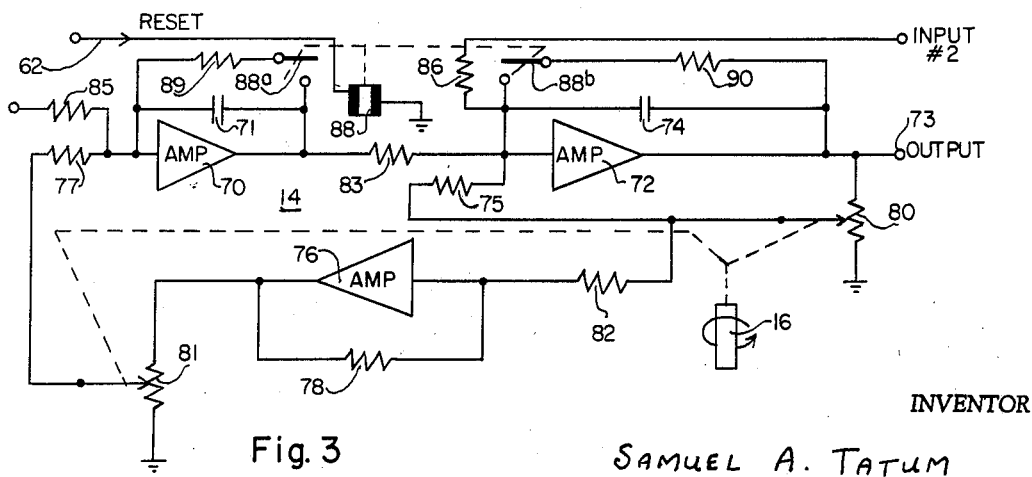
INVENTOR
SAMUEL A. TATUM
BY Shoemaker and Mattare
ATTORNEYS United States Patent Office 3,478,602
Patented Nov. 18, 1969

3,478,602
FILTER FOR A BALANCING MACHINE
Samuel A. Tatum, Newport News, Va., assignor to Newport News Shipbuilding and Dry Dock Company, Newport News, Va., a corporation of Virginia
Filed Oct. 28, 1966, Ser. No. 590,332
Int. Cl. G01m 1/16
U.S. Cl. 73—462        10 Claims

ABSTRACT OF THE DISCLOSURE

A system for filtering out undesired components coming from the vibration transducer means of a dynamic balancing machine to obtain a sine wave representing the fundamental unbalance motion of the workpiece being tested, the system including two substantially identical filter circuits having tuning means gauged together to adjust their resonant frequencies in unison, one filter circuit being connected to filter the transducer signals, and the other filter circuit being coupled to means for measuring its resonant frequency and comparing this measurement with a measurement of the rotational frequency of the workpiece to derive an error signal, and the system including means responsive to the error signal to adjust the filter circuits' resonant frequencies toward elimination of the error.

---

This invention relates to improvements in machines for dynamically balancing large rotating masses by measuring the degree of unbalanec and the phase angle thereof about the axis of rotation, and more particularly relates to improvements in the techniques for filtering the output of transducers measuring unbalance-induced vibrations or forces to recover the fundamental waveform thereof and eliminate harmonics and spurious noise.

The class of balancing machines to which the invention relates operates by providing measurements of the magnitude and phase of unbalance forces, from which information a determination is made of the weight which must be added or removed and the location thereof in order to bring the test piece more nearly into balance. Many prior-art machines employ a sine wave generator rotated with the test piece and having calibrated dials for adjusting the phase and amplitude of its output. This output is then used to null filtered signals taken from bearing force or vibration transducers, and the phase and amplitude of such a nulling signal as indicated by the calibrated dials provides the information read-out of the machine. It is to improvements in this general type of machine that the present invention is directed.

One of the most serious problems encountered in this type of machine resides in the fact that the output of the unbalance sensing transducers is not a pure sine wave of fundamental frequency equalling the shaft rotation frequency, but includes harmonics and noise components caused by extraneous vibration including bearing rumble, windage, etc. Therefore, the transducer output is a complex wave which cannot be nulled by a calibrated sine wave output from the sine wave generator. Hence, it is necessary to filter the transducer output in an effort to eliminate all but the desired sine wave fundamental.

In machines for balancing heavy workpieces such as ships propellers, the rotation rate is slow, seldom exceeding 300 r.p.m., and thus the fundamental wave occurs usually at or below 5 c.p.s., a difficult frequency to filter. Mechanical filtering is cumbersome and has severe limitations on its efficacy. Therefore, electrical signal filtering is attractive, but it is difficult to achieve a high-Q, as is required for effective undesired-component elimination, while providing a filter covering the frequency range of the output fundamental. Moreover, in many cases the test piece is brought up to a maximum speed, and then it is decoupled from the drive motor and allowed to coast-down through a continuously reducing range of r.p.m. while measurements are being taken, with the result that the fundamental frequency is continuously changing. Disconnecting of the test piece from the drive motor and its coupling during measurements is highly desirable because a drive motor adds spurious noise components of its own, and because a slight misalignment in the drive motor connection adds large components of once-per-revolution noise, generally degrading the output of the vibration transducers. The present invention is illustrated hereinafter by referring to a practical circuit used on a ship-propeller balancing machine in which each workpiece is brought up to between 100 and 300 r.p.m., decoupled from the drive motor, and allowed to coast down to 30 r.p.m. while measurements of unbalance magnitude and phase are being made by the techniques described above.

It is a principal object of this invention to provide an improved filter system for the output of the shaft vibration or force transducers in which the filter comprises a high-Q circuit having a resonant frequency which continuously tracks the r.p.m. of the workpiece within its useful range.

Another principal object of the invention is to provide a novel servo system for accomplishing highly accurate tracking of the filter's resonant frequency with the revolution rate of the workpiece, while avoiding mechanical loading of the workpiece to any significant extent, and while avoiding introducing of any spurious signals into the signal filter circuit. This invention teaches a novel solution to the problem of instantaneously measuring the resonant frequency of the filter and then correcting it to track the constantly decreasing r.p.m. of the workpiece.

In prior-art coast-down balancing machines the workpiece was brought up to an angular velocity exceeding the resonant frequency of the filter, and measurements were then made during the brief time interval when the rotation rate of the workpiece was passing through the said resonant frequency. It is an important object of this invention to greatly expand the time during which resonance of the filter matches the rotation rate of the workpiece shaft. Accurate tuning to resonance of the filter during measurements is important for the purpose of avoiding the introduction of unknown phase shifts onto the fundamental frequency by the filter itself, which shifts occur if the filter introduces reactive components of impedance.

It is a further object of this invention to provide a continuously tunable filter system in which the output amplitude of the combined transducer and filter is linearly proportional to the weight required to balance the test piece over the entire useful frequency range of the system. The transducer output, which comprises the input to the filter, is an unbalance force signal proportional to the unbalance weight times the square of the machine r.p.m. Thus the filter gain should be compensated inversely with regard to the test piece r.p.m. over the coasting range thereof.

Another object of this invention is to provide an easily tuned filter which avoids the difficulty of providing very large tunable reactances, as would be required as such low frequencies. The present filter system employs R-C circuitry using fixed capacitors and amplifiers with feedback, the tuning being accomplished by variable potentimometers all ganged together for simultaneous tuning by rotation of a common shaft.

It is another major object of this invention to provide novel means for determining the instantaneous resonant frequency of the main signal filter by using another duplicate filter having substantially identical characteristics and having its resonance control ganged to the main filter. The frequency of both filters is determined by making measurements of the natural period of the duplicate filter, assumed to be the same as the main-signal filter, and comparing the results of these measurements with the period of rotation of the workpiece. This comparision provides an error signal used to control a filter-tuning servo.

Other objects and advantages of the present invention will become apparent during the following discussion of the drawings, wherein:

FIG. 1 is a block diagram of a balancing machine of the general type to which this invention refers showing the addition to the usual balancing means of a high-Q main signal filter whose resonant frequency tracks the coast-down r.p.m. of the workpiece;

FIG. 3 is a schematic diagram of a suitable R-C tunable resonant filter circuit.

Figure 2:
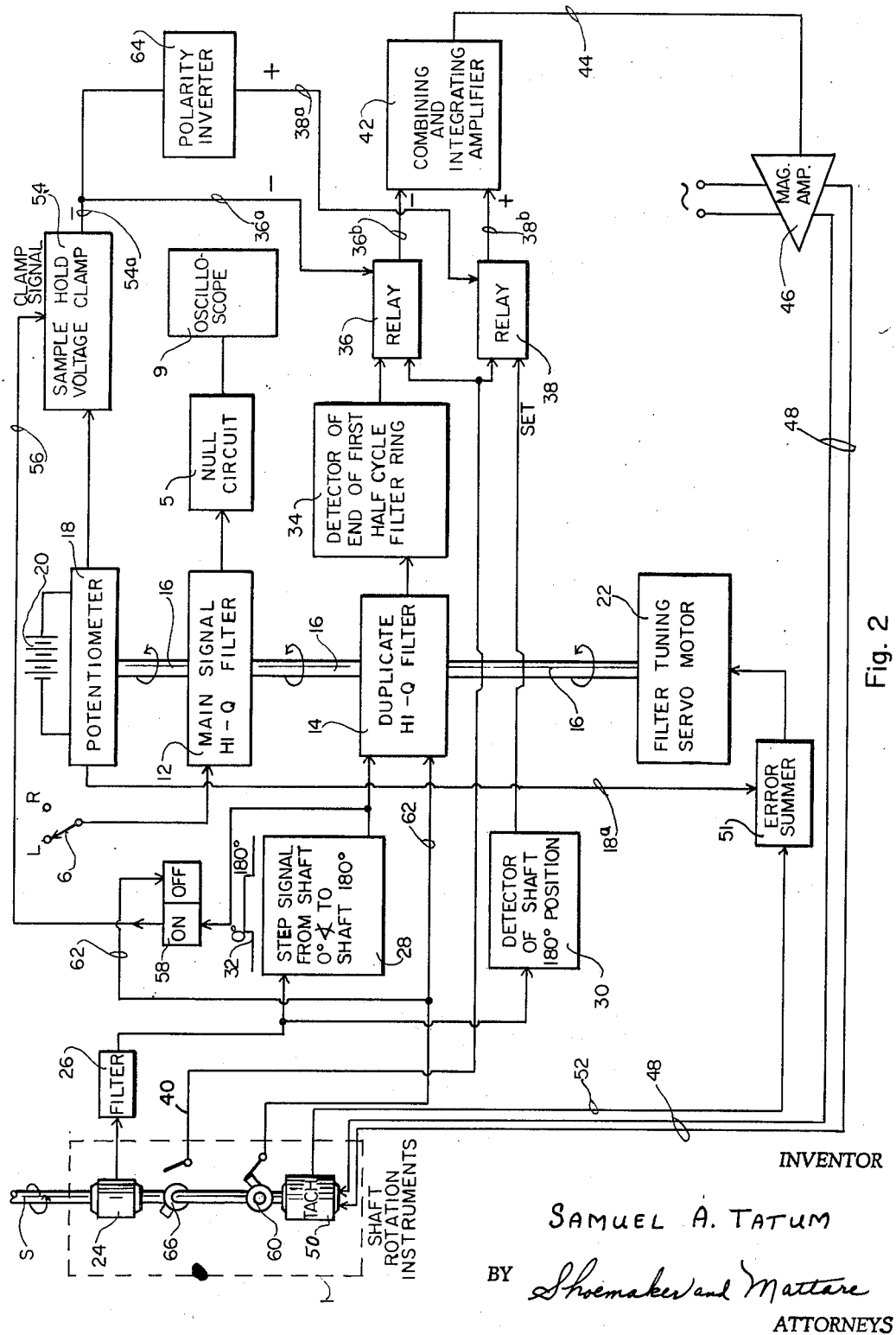
FIG. 2 is a block diagram showing the filter system including means for causing the resonant frequency of the filter to track the revolution rate of the workpiece.

Referring now to the drawing, FIG. 1 shows a balancing machine including two spaced bearings B mounted upon supporting cantilevers C and rotatably supporting the shaft S of a test piece P, for instance a ship's propeller. The cantilevers are supported on frames F which are assumed to be rigid and which support shaft transducers T which in the practical working model comprise load cells. The shaft S can be selectively connected through a suitable clutch K to the drive shaft D of a motor M whose speed can be controlled by any one of a number of conventional means, schematically illustrated by the rheostat R.

The other end of the shaft S is connected in FIG. 1 to a box 1 labeled "Shaft Rotation Instruments" and this box generally represents a tachometer, a syncro control transformer, and several rotary switches which turn with the shaft S and which are used to operate the various filter tuning means which will be explained in connection with FIG. 2. The shaft S is also connected to another sine wave generator 2 whose rotor rotates with the shaft S, and whose stator can be manually rotated by turning a dial 3 so as to change the phase of the output signal from the generator 2 through 360° of rotation. The generator 2 also includes a second dial 4 by which the excitation to the generator field is adjusted so as to change the amplitude of the generator's output. This output is a sine wave whose period is the same as the rotation period of the shaft S and whose phase and amplitude are both fully adjustable. The output of this generator is delivered to a combining circuit 5 which carries out a null function to be hereinafter described.

The left and right transducer T connect to a combining circuit and to a selector switch 6 so that the output of either of these transducers or combination thereof can be connected to the high-Q filter system which comprises the novel feature of the present invention, and which is generally designated by the reference numeral 10. The circuitry of this filter system 10 is the subject matter of FIG. 2. The dashed line L shown in FIG. 1 represents the means by which the high-Q filter 10 has its resonance automatically tuned so as to track the instantaneous rotation rate of the shaft S and workpiece P. The output of the filter on wire 7 comprises a fundamental sine wave whose frequency equals the rotation frequency of the shaft S, and whose phase and amplitude represent the magnitude and position of the workpiece unbalance.

FIG. 1 also shows a sweep circuit 8 connected to the horizontal terminal of an oscilloscope 9 so as to sweep its trace across the screen of the oscilloscope synchronously with the rotation of the shaft and workpiece P so that linear displacement of the oscilloscope trace in the horizontal direction corresponds with the angular position of the shaft S. The output of the combining circuit 5 is connected to the vertical terminal of the oscilloscope. As in prior-art balancing machines, the phase and amplitude dials 3 and 4 of the sine wave generator 2 are then adjusted so as to exactly null out the sinusoidal signal appearing on the wire 7, and the positions of the dials 3 and 4 are then read by the operator to determine the phase and magnitude of the unbalance being measured.

Referring now to the diagram of FIG. 2, the components appearing within the dashed box 1 are the shaft rotation instruments, and most of the circuitry shown to the right of the box 1 represents the contents of the tuned filter 10 appearing in FIG. 1.

The filter 10 includes two R-C filter circuits of the type shown in FIG. 3, and respectively labeled 12 and 14. These filters are substantially identical except for a few ancillary connections thereto, and both include a rotary control shaft 16 by which their tuning controls are ganged together. The shaft 16 extends upwardly to a potentiometer 18 which is also ganged with the tuning shafts of the filters, and is supplied from a suitable DC source such as a battery 20 with a constant input voltage. The output of the potentiometer 18 varies with the position of the shaft 16 and to obtain a variable voltage whose value depends upon the position of the filter tuning shaft. This shaft is connected to a servo motor 22 which rotates it for the purpose of causing the resonance of both filter circuits 12 and 14 to track the rotation rate of the test piece P as described hereinafter.

As mentioned in the objects of this invention, the duplicate filter 14 and the main signal filter 12 are made as nearly identical as possible so that it can be correctly assumed at any moment that both are tuned to the same frequency by their common control shaft 16. The main signal filter performs no other function than receiving a transducer signal from the switch 6, removing noise and harmonics components therefrom so as to obtain a fundamental sine wave, and then delivering this sine wave to the null circuit 5 as discussed in connection with FIG. 1. The duplicate filter 14 serves no other purpose than providing a determination of the momentary resonant frequency of the ganged filters 12 and 14. This latter function is accomplished by shocking the filter 14 into oscillation as the main shaft S passes through an arbitrary zero degree position of rotation, and then measuring the time between the shock initiation and the instant when the output of the duplicate filter 14 crosses the zero axis at the end of its first half-period of oscillation. If the duplicate filter is truly tuned to resonance at the rotation rate of shaft S, the shaft will pass through its 180° position at the same instant that the output from the filter 14 crosses the zero axis. Thus, the moment of occurrence of these two events will either correspond, or one will lag the other. The circuit of FIG. 2 includes means for determining whether there is an error signal, and if so the sign of that error signal, and then driving the servo motor 22 to reduce the error toward zero.

One of the shaft rotation instruments within the box 1 and driven by the shaft S is a sine wave generator 24 which delivers a sine wave crossing the zero axis at said arbitrary zero degree point in the rotation of the shaft S. The output of this generator 24 is a sine wave which is filtered to remove harmonics by a filter 26, the output of which is exactly in step with the rotation of the shaft S and passes through zero in the zero position of the shaft S. This sine wave is delivered to two paths comprising the boxes labeled 28 and 30 in the diagram of FIG. 2.

The box 28 comprises a circuit for generating a simple step signal from the sine wave delivered by the filter 26, the step signal being illustrated above the box and stepping up right after the shaft passes through zero degree position and maintaining a constant amplitude until well after the shaft has passed the 180° position. This can be accomplished by a simple high-gain saturating amplifier and latching device. The amplifier employed in the practical embodiment of this invention has a rise time of about two microseconds to full amplitude after the shaft S passes through zero degree position, and because of the shortness of this rise time the step signal is considered to start at time zero for all practical purposes. The gain of the filter circuit 14 acting on a signal injected at input #2 in FIG. 3, is inversely proportional to the filter resonant frequency. In order to maintain a constant signal level in the filter 14, the magnitude of the step signal is clamped to the output of the sample-hold circuit 54 whose output is nominally proportional to the filter's resonant frequency. The step is maintained after the 180° point until it is released by switch 60. The leading edge 32 of this step signal shocks the duplicate filter 14 into oscillation at its then resonant frequency, and thus the filter delivers an output to a detector box 34 which detects the instant when the output signal from the filter 14 crosses the zero axis at the end of its first half cycle, this detector again comprising a simple saturating high-gain amplifier, biased so that it delivers a strong output signal substantially as the output of the high-Q filter goes through its zero axis as it reverses polarity. The output of the detector 34 is used to set the relay 36 into closed position, thereby connecting the wire 36a with the wire 36b.

The other branch of the output from the filter 26, comprising the sine wave representing the actual position of the shaft S, is delivered to the detector 30 which detector is similar to the detector 34 and is sensitive to the moment when the sine wave from the filter 26 crosses the zero axis at the 180° position of the shaft S. The output of the detector 30 is used to set the relay 38 into closed position, thereby connecting the wire 38a to the wire 38b. The relays 36 and 38, once closed, remain energized until they are both reset to open condition by a signal appearing on the wire 40, as will be hereinafter explained.

The signal from relay 36, when it appears on wire 36b, represents substantially the exact moment when the duplicate filter 14 has completed the first half cycle of its ringing after being shocked by the time-zero pulse from the box 28. The output signal from the relay 38 on the wire 38b represents the moment when the shaft S has completed its first 180° of rotation. The signals appearing on the wires 36b and 38b are of opposite polarity and of equal amplitude, and they are combined by feeding both of them directly into a combining and integrating amplifier 42. If they arrive at the input to the amplifier 42 simultaneously, they are mutually cancelled out and no error signal appears on the wire 44 because there is no error between the resonant frequency of the filter 14 and the rotation rate of the shaft S. On the other hand, if one of the signals on the wires 36b and 38b arrives earlier than the other, no cancellation of their inputs occurs until the other signal arrives, and therefore the amplifier 42 is driven strongly in either the positive or negative polarity direction so as to provide a strong error signal on the wire 44 which persists until the other polarity signal arrives, the integrated level of the error signal being proportional to the differences in times of arrival. The error signal varies in polarity depending on whether the duplicate filter has a resonant frequency above or below the rotation rate of the shaft. The combining amplifier 42 not only sums the two signals appearing on wires 36b and 38b, but it also integrates these signals with time so as to provide an error control signal on the wire 44. This signal is delivered to a magnetic amplifier 46 which excites the tachometer 50 through the wire 48 for the purpose of changing its calibration. The output of the tachometer 50 is rectified, filtered, and combined in an error summer 51 with the DC signal level of the potentiometer wiper 18a to form an error signal used to command the adjustment servo motor 22. The level of bias on the magnetic amplifier 46 is of the proper level to produce a tachometer calibration nominally of the correct value to cause the filter tuning servo 22 to properly adjust the filter potentiometers. The additional bias from the integrating amplifier 44 corrects the tachometer calibration to compensate for system nonlinearities and tachometer calibration drift. The polarity of the signals appearing on the wires 36b and 38b, whichever is applied to the amplifier 42 first, determines the polarity of the error-signal 44 from the amplifier 42, and this determines whether the tachometer calibration is to be increased or decreased.

However, it should be noted that the error signal is generated by time integration and hence a given percent error at slow speeds will result in a larger percent change in tachometer calibration than the same error at high speeds if relays 36 and 38 switch the same voltage to the integrator at both speeds. This variation is corrected by making the amplitude of the correction signals appearing on the wires 36b and 38b adjust with changes in position of the tuning shaft 16. The filter tuning servo follow-up potentiometer 18 provides such a variation, as its output on wire 18a changes with the position of the tuning shaft 16.

Each time a correction of the shaft 16 is about to be accomplished, a sample is taken of the voltage appearing on the wire 18a by the sample and hold circuit 54, the sampling beginning and ending just before the zero position of the shaft S. For the remainder of the shaft S revolution, the voltage on wire 54a is then held at the level equal to the voltage that was on input wire 18a when the shaft S was in the zero position. Thus, the voltage which appears on the wire 54a determines the amplitude of the voltage which can appear on either or both of the wires 36b or 38b when their respective relays are set to closed position. Assuming for the sake of discussion that the output on wire 54a is positive, a polarity inverter 64 then provides a negative voltage to the wire 38a, without changing the numerical value of the amplitude of the voltage. In this way, the error signal amplitude is tailored to compensate for the longer integration times at slower speeds.

As stated above, the first of the relays 36 or 38 to close provides a signal input to the combining and integrating amplifier 42 whose polarity depends on which of the relays has just closed. Subsequently, the other relay will close providing a signal of opposite polarity which thenceforth balances out the first signal, i.e., for the remainder of that tuning cycle. Both relays 36 and 38 are opened simultaneously by a signal appearing on the reset wire 40. This signal comes from a rotary switch 66 which closes about 5 degrees before zero degree position of the shaft S to thereby reset both relays 36 and 38 to open position. Since neither relay is expected to close for about the first 180 degrees of shaft S rotation, the switch 66 is allowed to remain closed for another 20 degrees after zero degree shaft position in order to be sure of allowing enough time for the resetting of the relays 36 and 38.

Referring now to FIG. 3, this figure shows a schematic diagram of the duplicate filter 14, which is virtually the same as the filter 12. The filter 14 is illustrated since it contains several auxiliary components not found in filter 12. The filter essentially comprises two amplifiers 70 and 72 connected in series and delivering an output to terminal 73. These are commercially manufactured standard amplifiers as will be seen in the table attached near the end of this specification. The amplifiers are shunted by time-constant capacitors 71 and 74 in the series branch including the two amplifiers. Regenerative feedback from the output 53 of the filter is introduced by a resistance 77 into the input, and this feedback is sufficient to raise the filter's Q but preferably not to a level at which the filter would break into continuous self-oscillation. The feedback is provided through an operational amplifier 76 which is also identified in the subsequent parts list. The gain in this feedback path is determined by the ratio of the resistance of the fixed resistor 78 to the fixed resistor 82, and by the positions of the wipers in potentiometers 80 and 81 determines the resonant frequency of the filter. The upper path including the two amplifiers 70 and 72 is coupled together by a resistance 83, and the damping rate of the amplifier is governed by the selected value of damping resistor 75. The present diagram of FIG. 3 includes two inputs, the first input being through a resistor 85 at the beginning of the network, and only this input is used when the circuit is employed as the main-signal filter 12. The second input is through a coupling resistor 86 which does not appear in the circuit when it is used as the main filter 12.

When the circuit is used as the duplicate filter 14, input #1 is grounded, the damping resistor 75 is connected to ground instead of to amplifier 72, and input #2 is coupled to the output of the step signal generator 28 shown in FIG. 2. FIG. 3 also includes a reset relay 88 which is included only in the filter 14, and which relay is normally open. It is connected to be controlled by the wire 62 to close the relay momentarily whenever the switch 60, FIG. 2, is closed. This occurs just before the beginning of each new revolution of the shaft S and is opened prior to the shaft S reaching zero degree position, and results in momentary closing of the contacts 88a and 88b to short-circuit the two capacitors 71 and 74 through current limiting resistors 89 and 90. By short-circuiting the capacitors 71 and 74, the filter is returned to a fully relaxed state so that when it is pulsed as the shaft passes through the zero degree position, the first-half cycle of the filter will truly represent its half-period ring time.

A set of suitable components for the filters 12 and 14 is shown as follows, and is suitable where the filters are tunable to resonance over a frequency range of 0.5 to 5 c.p.s.:

| | |
|---|---|
| Amplifiers 70 and 72 | Philbrick model K2W. |
| Operational amplifier 76 | Philbrick model K2X. |
| Capacitors 71 and 74 | 0.1 mfd., 0.1%. |
| Resistors 77, 78, and 82 | 1 meg., 0.1%. |
| Resistor 83 | .25 meg., 0.1%. |
| Resistors 88 and 90 | 500 ohm, 10%. |
| Potentiometers 80 and 81 | Helipot 50K, 0.1%. |
| Resistor 85 | 1.5 meg., 1 %. |
| Resistor 86 | 500K, 10%. |
| Resistor (damping) 75 | 4 meg., 1%. |

This invention is not to be limited to the illustrative embodiment shown in the drawings, for obviously changes may be made therein within the scope of the following claims.

I claim:

1. In a machine for determining the dynamic unbalance of a workpiece which has been accelerated to a frequency of rotation within a range of operating frequencies while supported on a shaft operatively associated with vibration transducer means and the machine having means for determining the nature of said unbalance based upon vibration signals from said transducer means, an improved system for filtering said signals to recover the fundamental component of the unbalance-induced vibrations, comprising:

(a) two substantially identical high-Q filter circuits having common means for tuning their resonant frequencies in unison, and one of said filter circuits coupling said transducer means to said unbalance determining means;

(b) means for periodically measuring the resonant frequency characteristic of the other filter circuit to determine a parameter proportional to its resonant period;

(c) means for sensing the instantaneous frequency of rotation of the workpiece to determine a parameter proportional to the period of its rotation;

(d) means for receiving said parameters and for deriving an error signal representing the difference between said periods; and (e) means for adjusting said common tuning means in response to said error signal to tune the resonant frequencies of said filter circuits to track said frequency of rotation.

2. In an improved filtering system as set forth in claim 1, said adjusting means comprising a servo system responsive to said error signal to tune the filter circuits in a direction to reduce the error.

3. A system as set forth in claim 1, wherein said filter circuits comprise R-C filters having potentiometers all ganged together for unitary rotation and controlling their resonant frequencies.

4. In a system as set forth in claim 1, said sensing means having means for timing the time of rotation of the shaft through a preselected number of degress from an arbitrary zero degree position, said resonant frequency measuring means having means for measuring the ring-time of the filter through the same number of electrical degrees commencing when the shaft passes through said zero position; and said error signal deriving means comprising an integrating amplifier coupled to said sensing and measuring means and having an output error signal whose polarity depends upon which measured time is shorter and whose amplitude depends upon the duration of the time difference therebetween.

5. A system as set forth in claim 1, wherein said filter circuits comprise filters having tuning means ganged to a common tuning shaft; an auxiliary potentiometer coupled to said shaft; means coupled to the potentiometer for delivering two voltages of opposite polarity whose magnitudes are similar and variable with the position of the potentiometer; said periodic measuring means including means for shocking said other filter to cause it to ring as the workpiece passes through a selected arbitrary position; said sensing means including means for sensing the mechanical rotation of said workpiece after it passes said arbitrary position; an integrating amplifier; means for closing a first circuit connecting one of said two voltages to said integrating amplifier when said other filter has run through a certain predetermined number of electrical degrees, means for closing a second circuit to said integrating amplifier from the other of said two voltages when the workpiece has rotated through the same predetermined number of mechanical degrees, said integrating amplifier delivering an error signal dependent upon which circuit is closed first; and servo means coupled to said tuning shaft and responsive to said error signal to turn the shaft to reduce the error.

6. In a system as set forth in claim 1, a sine wave generator coupled to rotate with the workpiece and delivering a sine wave locked to said rotation rate, said sensing means including detector means for determining the zero degree position and the 180° position of said sine wave; said periodic measuring means including means coupled to the zero degree detector and responsive thereto to shock said other filter circuit into oscillation; detector means for determining when the latter oscillation has completed 180° electrical degrees; said error signal deriving means including comparison means coupled to both 180° detector means and responsive to differences in their instants of detection to deliver an error signal, and said adjusting means including means responsive to said error signal to tune the filter circuits to reduce said difference.

7. In a system as set forth in claim 6, a source of two voltages of the same magnitude but opposite polarity, said comparison means comprising an amplifier, and said error signal deriving means including separate means for completing circuits from said source voltages to said amplifier, each such means being actuated by a different one of said 180° detector means, said error signal having a polarity dependent upon which of the voltages is connected to the amplifier first; and said adjusting means driving said tuning means in a direction determined by the polarity of the error signal.

8. In a system as set forth in claim 7, said source including a potentiometer circuit ganged for tuning with said filter circuits and having an output voltage whose magnitude varies with the instantaneous tuning position of the filter circuit.

9. In a system as set forth in claim 8, said amplifier comprising an integrating amplifier whose output error-signal amplitude varies according to the magnitude of the potentiometer voltage, and depends upon the duration of the time difference between the closing of the first of the separate circuits and the closing of the second of the separate circuits; and said system having means for opening both of said separate circuits before the next zero-degree position occurs.

10. In a system as set forth in claim 9, said adjusting means comprising a servo system coupled to tune the filter circuits in a direction determined by the polarity of the error signal and at a rate determined by its amplitude.

References Cited

UNITED STATES PATENTS 3,307,408   3/1967   Thomas _____ 73—462

FOREIGN PATENTS 729,901   5/1955   Great Britain.

JAMES J. GILL, Primary Examiner
H. GOLDSTEIN, Assistant Examiner